(12) United States Patent
Kubo (10) Patent No.: US 11,407,420 B2
(45) Date of Patent: Aug. 9, 2022

(54) VEHICLE CONTROL APPARATUS AND METHOD OF CONTROLLING VEHICLE-CONTROL FORCE

(71) Applicant: SUBARU CORPORATION, Tokyo (JP)

(72) Inventor: Tatsuhiro Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 325 days.

(21) Appl. No.: 16/837,012

(22) Filed: Apr. 1, 2020

(65) Prior Publication Data

US 2020/0317197 A1    Oct. 8, 2020

(30) Foreign Application Priority Data

Apr. 2, 2019    (JP) .............................. JP2019-070715

(51) Int. Cl.
*B60W 30/182* (2020.01)
*B60W 30/14* (2006.01)
*B60W 50/14* (2020.01)

(52) U.S. Cl.
CPC ........ *B60W 30/182* (2013.01); *B60W 30/143* (2013.01); *B60W 50/14* (2013.01);
(Continued)

(58) Field of Classification Search
CPC .. B60W 30/182; B60W 30/143; B60W 50/14; B60W 2050/146;
(Continued)

(56) References Cited

U.S. PATENT DOCUMENTS 3,709,338 A * 1/1973 Glen ..................... B60W 10/04
477/215
2001/0027368 A1* 10/2001 Minowa ............... B60K 31/042
701/93

(Continued)

FOREIGN PATENT DOCUMENTS

JP    2000-205015 A    7/2000

*Primary Examiner* — Jeff A Burke
*Assistant Examiner* — Madison B Emmett
(74) *Attorney, Agent, or Firm* — McDermott Will & Emery LLP (57) ABSTRACT

A vehicle control apparatus controls a vehicle-control force of a vehicle that is switchable between traveling under normal traveling control and traveling under cruise control. The apparatus includes a first target-vehicle-control-force determination unit, a second target-vehicle-control-force determination unit, and a vehicle-control-force controlling unit. The first target-vehicle-control-force determination unit determines a target vehicle-control force of the normal traveling control on the basis of an accelerator position, and switches a control mode of the normal traveling control between a normal mode and a one-pedal mode. The second target-vehicle-control-force determination unit determines a target vehicle-control force of the cruise control, and execute override when the accelerator position is greater than a reference accelerator position in the cruise control. The vehicle-control-force controlling unit controls the vehicle-control force on the basis of the target vehicle-control force determined by the first target-vehicle-control-force determination unit or the second target-vehicle-control-force determination unit.

14 Claims, 7 Drawing Sheets

(52) U.S. Cl.
CPC .............. *B60W 2050/146* (2013.01); *B60W 2510/0604* (2013.01); *B60W 2720/10* (2013.01)

(58) Field of Classification Search
CPC ..... B60W 2510/0604; B60W 2720/10; B60W 50/082; B60W 2540/10; B60W 2710/083; B60W 50/10; B60W 30/18127; B60W 10/04; B60W 10/18; B60W 2710/18; B60W 2720/106; B60K 2310/246; Y02T 10/72; B60Y 2200/91
See application file for complete search history.

(56) References Cited

U.S. PATENT DOCUMENTS

| | | | | |
|---|---|---|---|---|
| 2018/0186352 | A1* | 7/2018 | Goto | B60T 8/00 |
| 2018/0319397 | A1* | 11/2018 | Ohta | B60W 10/04 |
| 2018/0326852 | A1* | 11/2018 | Shiozawa | B60L 15/2009 |
| 2019/0204828 | A1* | 7/2019 | Ishikawa | G05D 1/0223 |

* cited by examiner

VEHICLE CONTROL APPARATUS AND METHOD OF CONTROLLING VEHICLE-CONTROL FORCE

CROSS-REFERENCE TO RELATED APPLICATIONS

The present application claims priority from Japanese Patent Application No. 2019-070715 filed on Apr. 2, 2019, the entire contents of which are hereby incorporated by reference.

BACKGROUND

The disclosure relates to a vehicle control apparatus and a method of controlling a vehicle control force.

A technology is known that controls acceleration and deceleration rates of a vehicle on the basis of acceleration and deceleration operations by a driver, under a so-called normal mode as well as a one-pedal mode. In the normal mode, the vehicle is accelerated when a driver operates an accelerator pedal and decelerated when the driver operates a brake pedal. In the one-pedal mode, the vehicle is accelerated or decelerated through operations only on the accelerator pedal. Reference is made to Japanese Unexamined Patent Application Publication No. 2000-205015, for example. In the one-pedal mode, a one-pedal characteristic is set as an accelerator position characteristic that defines a relation between a target vehicle-control force (i.e., target acceleration or deceleration rate of the vehicle) and each accelerator position. In the one-pedal characteristic, the target vehicle-control force based on the accelerator position changes from a value on a braking force side to a value on a driving force side as the accelerator position increases.

SUMMARY

An aspect of the technology provides a vehicle control apparatus configured to control a vehicle-control force of a vehicle that is switchable between traveling under normal traveling control in which the vehicle-control force is controlled on a basis of an acceleration operation or a deceleration operation by a driver and traveling under cruise control in which the vehicle-control force is automatically controlled regardless of the acceleration operation and the deceleration operation by the driver. The apparatus includes a first target-vehicle-control-force determination unit, a second target-vehicle-control-force determination unit, and a vehicle-control-force controlling unit. The first target-vehicle-control-force determination unit is configured to: determine a target vehicle-control force of the normal traveling control on a basis of an accelerator position, and switch, upon the determination of the target vehicle-control force of the normal traveling control, a control mode of the normal traveling control between a normal mode and a one-pedal mode. The normal mode uses a normal characteristic in which a target vehicle-control force for each accelerator position takes a value on a driving force side over an accelerator position range. The one-pedal mode uses a one-pedal characteristic in which the target vehicle-control force for each accelerator position changes from a value on a braking force side to a value on the driving force side as the accelerator position increases. The second target-vehicle-control-force determination unit is configured to: determine a target vehicle-control force of the cruise control; and execute, when the accelerator position is greater than a reference accelerator position corresponding to the target vehicle-control force of the cruise control, override in which a target vehicle-control force of the override is determined on a basis of an accelerator position characteristic that defines a relation between an accelerator position and a target vehicle-control force. The vehicle-control-force controlling unit is configured to control the vehicle-control force on a basis of the target vehicle-control force determined by the first target-vehicle-control-force determination unit or the second target-vehicle-control-force determination unit. In a case where the one-pedal mode is set as the control mode of the normal traveling control, the second target-vehicle-control-force determination unit is configured to set a middle characteristic as the accelerator position characteristic for the override. The target vehicle-control force for each accelerator position is greater in the middle characteristic than in the one-pedal characteristic and less in the middle characteristic than in the normal characteristic over the accelerator position range.

An aspect of the technology provides a method of controlling a vehicle-control force of a vehicle that is switchable between traveling under normal traveling control in which the vehicle-control force is controlled on a basis of an acceleration operation or a deceleration operation by a driver and traveling under cruise control in which the vehicle-control force is automatically controlled regardless of the acceleration operation and the deceleration operation by the driver. The method includes: determining a target vehicle-control force of the normal traveling control on a basis of an accelerator position, and making, upon the determining the target vehicle-control force of the normal traveling control, a switch between a normal characteristic in which a target vehicle-control force for each accelerator position takes a value on a driving force side over an accelerator position range and a one-pedal characteristic in which the target vehicle-control force for each accelerator position changes from a value on a braking force side to a value on the driving force side as the accelerator position increases; determining a target vehicle-control force of the cruise control; executing, when the accelerator position is greater than a reference accelerator position corresponding to the target vehicle-control force of the cruise control in the cruise control, override in which a target vehicle-control force of the override is determined on a basis of an accelerator position characteristic of the vehicle; and setting, in a case where the target vehicle-control force of the normal traveling control is determined using the one-pedal characteristic, the accelerator position characteristic for the override to a middle characteristic. The target vehicle-control force for each accelerator position is greater in the middle characteristic than in the one-pedal characteristic and less in the middle characteristic than in the normal characteristic over the accelerator position range.

An aspect of the technology provides a vehicle control apparatus configured to control a vehicle-control force of a vehicle that is switchable between traveling under normal traveling control in which the vehicle-control force is controlled on a basis of an acceleration operation or a deceleration operation by a driver and traveling under cruise control in which the vehicle-control force is automatically controlled regardless of the acceleration operation and the deceleration operation by the driver. The apparatus includes circuitry configured to: switch a control mode of the normal traveling control between a normal mode using a normal characteristic in which a target vehicle-control force for each accelerator position takes a value on a driving force side over an accelerator position range and a one-pedal mode using a one-pedal characteristic in which the target vehicle-control force for each accelerator position changes from a value on a braking force side to a value on the driving force side as the accelerator position increases; execute, when the accelerator position is greater than a reference accelerator position corresponding to a target vehicle-control force of the cruise control in the cruise control, override in which a target vehicle-control force of the override is determined on as basis an accelerator position characteristic of the vehicle; and determine, in a case where the one-pedal mode is set as the control mode of the normal traveling control, the target traveling-control force of the override using a middle characteristic as the accelerator position characteristic for the override. The target vehicle-control force for each accelerator position is greater in the middle characteristic than in the one-pedal characteristic and less in the middle characteristic than in the normal characteristic over the accelerator position range.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, a control apparatus 100 according to an example embodiment of the technology is mounted in an electric vehicle 1 that includes only a drive motor as a driving source. However, a vehicle to which the control apparatus 100 is applied should not be limited thereto. For example, the control apparatus 100 may be mounted in a hybrid vehicle that includes a drive motor and an engine as driving sources. Alternatively, the control apparatus 100 may be mounted in an engine-powered vehicle that includes only an engine as a driving source.

Although adaptive cruise control is executed as cruise control in the following embodiments, so-called autocruise control that maintains a set vehicle speed of the vehicle may be alternatively executed as the cruise control. In a case where override is executed in the autocruise control where the one-pedal mode is set as the control mode, a middle characteristic may be set as an accelerator position characteristic for the override, as described below. It therefore is possible to appropriately improve the operability of the vehicle 1.

[1. Exemplary Configuration of Vehicle]

An exemplary configuration of the vehicle 1 in which the control apparatus 100 according to an example embodiment of the technology is mounted will now be described with reference to FIGS. 1 to 3.

Figure 1:
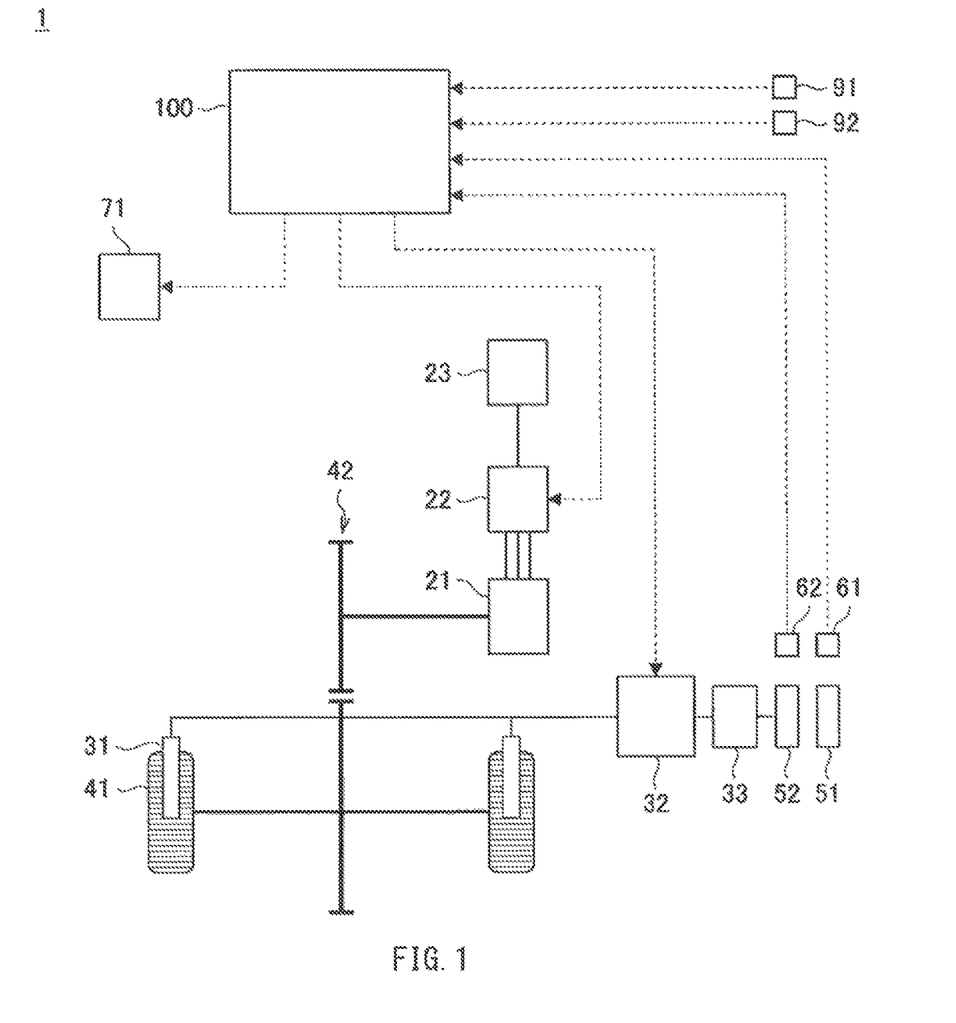
FIG. 1 is a schematic diagram illustrating an exemplary outline configuration of a vehicle that includes a control apparatus according to one example embodiment of the technology.

FIG. 1 is a schematic diagram illustrating an exemplary outline configuration of the vehicle 1.

The vehicle 1 may be an electric vehicle that includes only a drive motor 21 as a driving source. The vehicle 1 may be driven by a driving force outputted from the drive motor 21.

With reference to FIG. 1, the vehicle 1 may include the drive motor 21, an inverter 22, a battery 23, brake mechanisms 31, a hydraulic pressure supply unit 32, a master cylinder 33, driving wheels 41, a powertrain 42, an accelerator pedal 51, a brake pedal 52, an accelerator position sensor 61, a brake sensor 62, a display 71, a vehicle speed sensor 91, a preceding vehicle sensor 92, and the control apparatus 100, for example.

The drive motor 21 may output a driving force to be transmitted to the driving wheels 41 of the vehicle 1. The drive motor 21 may be a polyphase (e.g., three-phase) AC motor, for example. The drive motor 21 may be coupled to the battery 23 via the inverter 22 and generate a driving force from electric power received from the battery 23 through the inverter 22. Optionally, the drive motor 21 may also serve as a regenerative power generator that generates regenerative power from rotational energy of the driving wheels 41 while the vehicle 1 is decelerating.

The drive motor 21 may have an output shaft that is coupled to the driving wheels 41 through the powertrain 42, for example. A driving force outputted from the drive motor 21 may be transmitted to the driving wheels 41 through the powertrain 42. The powertrain 42 may include a transmission mechanism, for example. The driving force outputted from the drive motor 21 may be converted at the transmission mechanism and transmitted to the driving wheels 41. The driving wheels 41 that receive the driving force from the drive motor 21 may be the front or rear wheels of the vehicle 1. Alternatively, the driving force outputted from an output terminal of the powertrain 42 may be transmitted to the front and rear wheels via a non-illustrated propeller shaft. Still alternatively, the vehicle 1 may include two drive motors 21 independent from each other: One may be used for outputting a driving force to be transmitted to the front wheels, and the other may be used for outputting a driving force to be transmitted to the rear wheels.

The inverter 22 may be a power converter that converts electric power between direct-current (DC) electric power and alternating-current (AC) electric power. The inverter 22 may include a polyphase bridge circuit, for example. The inverter 22 may convert DC electric power received from the battery 23 into AC electric power and send the AC electric power to the drive motor 21. The inverter 22 may also convert AC electric power generated through regenerative power generation by the drive motor 21 into DC electric power and send the DC electric power to the battery 23.

The battery 23 may store electric power to be fed to the drive motor 21. For example, the battery 23 may have a voltage (e.g., 100 volts) higher than a non-illustrated auxiliary battery that stores electric power to be fed to auxiliary components in the vehicle 1. The battery 23 may be, for example, a secondary battery, such as a lithium ion battery, a lithium ion polymer battery, a nickel hydride battery, a nickel nickel-cadmium battery, or a lead-acid battery.

The master cylinder 33 may be coupled to the brake pedal 52 via a non-illustrated servo unit. The master cylinder 33 may generate hydraulic pressure on the basis of a braking operation quantity, which is the quantity of operation of the brake pedal 52. The master cylinder 33 may be coupled to the brake mechanisms 31 of the respective driving wheels 41 via the hydraulic pressure supply unit 32. Hydraulic pressure generated at the master cylinder 33 may be supplied to the brake mechanisms 31 via the hydraulic pressure supply unit 32.

The brake mechanisms 31 may apply a braking force to the vehicle 1. For example, the braking force applied to the vehicle 1 may be equal to the sum of the braking forces applied from the brake mechanisms 31 to the respective driving wheels 41.

Each of the brake mechanisms 31 may include a non-illustrated brake caliper including a wheel cylinder and a pair of brake pads, for example. The brake pads may face respective sides of a brake disc that rotates integrally with the driving wheel 41, for example. The wheel cylinder disposed in the brake caliper may include slidable pistons. One ends of the pistons may face the respective brake pads. In conjunction with a sliding movement of each of the pistons, the corresponding brake pad may move toward the corresponding side of the brake disc. Hydraulic pressure generated by the master cylinder 33 may be supplied to the wheel cylinder in each of the brake mechanisms 31. This may cause the pistons and the brake pads in the brake caliper to move to hold the brake disc between the paired brake pads on the respective sides of the brake disc, applying a braking force to the corresponding driving wheel 41.

The hydraulic pressure supply unit 32 may regulate the hydraulic pressure to be applied to the brake mechanisms 31. The hydraulic pressure supply unit 32 may include a pump or a control valve, for example. The hydraulic pressure to be applied to the brake mechanisms 31 may be independently regulated by the hydraulic pressure supply unit 32 or may be respectively regulated by two brake systems in the hydraulic pressure supply unit 32. The braking force applied to the driving wheels 41 may be controlled by controlling an operation of the hydraulic pressure supply unit 32.

The accelerator pedal 51 may receive an acceleration operation by the driver. The acceleration operation may correspond to an operation of pressing the accelerator pedal 51, for example.

The brake pedal 52 may receive a braking operation by the driver. The braking operation may correspond to an operation of pressing the brake pedal 52, for example.

The accelerator position sensor 61 may detect an accelerator position and output the detected accelerator position. The accelerator position may correspond to the quantity of operation of the accelerator pedal 51 by the driver.

The brake sensor 62 may detect the braking operation quantity and output the detected braking operation quantity. The braking operation quantity may correspond to the quantity of operation of the brake pedal 52 by the driver, as described above.

The display 71 may display visual information. The display 71 may be, for example, a navigator that guides the driver to the destination set by the driver, a device that displays various kinds of images using head-up display (HUD) technology, or a display device, such as a transmissive display, that is overlaid on the front windshield.

The vehicle speed sensor 91 may detect a vehicle speed of the vehicle 1 and output the detected vehicle speed.

The preceding vehicle sensor 92 may obtain preceding-vehicle data and output the obtained preceding-vehicle data. For example, the preceding vehicle sensor 92 may detect the presence or absence of a preceding vehicle, an inter-vehicular distance between an own vehicle (i.e., the vehicle 1) and the preceding vehicle, and a relative speed of the own vehicle to the preceding vehicle, as the preceding-vehicle data. The preceding vehicle sensor 92 may be a millimeter-wave radar sensor, for example; however, examples of the preceding vehicle sensor 92 should not be limited thereto. Alternatively, the preceding vehicle sensor 92 may be a device that captures an image of an environment in front of the vehicle 1 and obtain the preceding-vehicle data from the captured image.

The control apparatus 100 may include, for example, a central processing unit (CPU), which is an arithmetic processing unit, a read only memory (ROM), which is a memory storing programs and operation parameters to be used by the CPU, and a random access memory, which is a memory temporarily holding parameters configured to vary during the execution of the CPU as appropriate and other data items.

The control apparatus 100 may communicate with various components in the vehicle 1, including the inverter 22, the hydraulic pressure supply unit 32, the accelerator position sensor 61, the brake sensor 62, the display 71, the vehicle speed sensor 91, and the preceding vehicle sensor 92. The communication between the control apparatus 100 and these components may be established via controller area network (CAN), for example.

Functions of the control apparatus 100 may be shared among several control apparatuses. In such a case, the control apparatuses may be coupled to one another via a communication bus such as CAN. Optionally, the control apparatus 100 may have other functions in addition to the functions described below.

Figure 2:
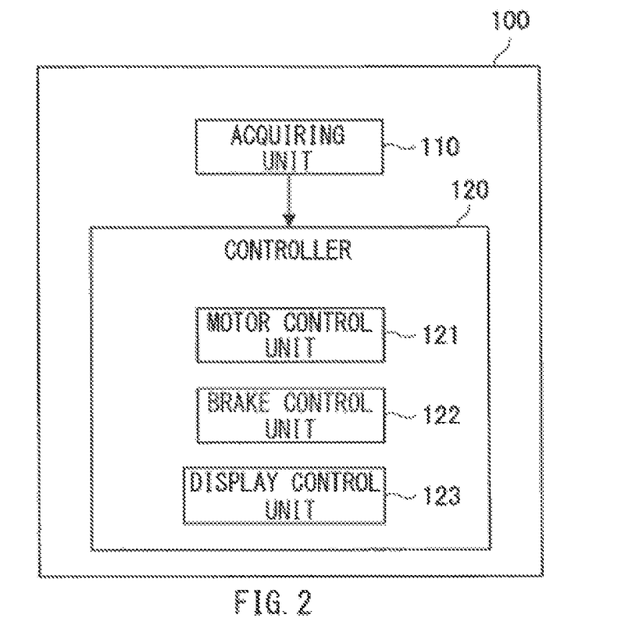
FIG. 2 is a block diagram illustrating an exemplary configuration of the control device illustrated in FIG. 1.

FIG. 2 is a block diagram illustrating an exemplary configuration of the control apparatus 100.

As illustrated in FIG. 2, the control apparatus 100 may include an acquiring unit 110 and a controller 120, for example. In one embodiment, the controller 120 may serve as a "first target-vehicle-control-force determination unit", a "second target-vehicle-control-force determination unit", and a "vehicle-control-force controlling unit". In one embodiment, the display 71 may serve as a "display unit".

The acquiring unit 110 may acquire various kinds of data to be used in a process executed by the controller 120 and output the acquired data to the controller 120. For example, the acquiring unit 110 may acquire various kinds of data from the accelerator position sensor 61, the brake sensor 62, the vehicle speed sensor 91, and the preceding vehicle sensor 92 by communicating with these sensors.

The controller 120 may control an operation of each component of the vehicle 1. The controller 120 may include a motor control unit 121, a brake control unit 122, and a display control unit 123, for example.

The motor control unit 121 may control an operation of the drive motor 21. For example, the motor control unit 121 may control electric power supply between the drive motor 21 and the battery 23 by controlling an operation of a switching device in the inverter 22. The motor control unit 121 may thereby control the generation of a driving force and electric power at the drive motor 21.

The brake control unit 122 may control operations of the brake mechanisms 31. For example, the brake control unit 122 may control a braking force to be applied to the driving wheels 41 by controlling an operation of the hydraulic pressure supply unit 32. The brake control unit 122 may thereby control the braking force to be applied from the brake mechanisms 31 to the vehicle 1.

The display control unit 123 may control an operation of the display 71. For example, the display control unit 123 may control the displaying of the display 71 by outputting data on the contents to be displayed on the display 7.

The controller 120 may control acceleration and deceleration rates of the vehicle 1 by controlling operations of the drive motor 21 and the brake mechanisms 31 as described above. The controller 120 makes a switch between normal traveling control and cruise control. In the normal traveling control, the acceleration and deceleration rates of the vehicle 1 are controlled on the basis of a driver's acceleration or deceleration operation (e.g., accelerating or braking operation). In the cruise control, adaptive cruise control (ACC), which is one example of the cruise control, may be performed. In the ACC, the acceleration and deceleration rates of the vehicle 1 are automatically controlled regardless of the driver's acceleration or deceleration operation.

Note that the ACC is a mere example of the cruise control. Alternatively, the controller 120 may perform so-called autocruise control that maintain a set vehicle speed of the vehicle 1 as the cruise control, as described above. In the autocruise control, the controller 120 may perform override as described below.

For example, the vehicle 1 may be provided with an input device, such as a button, with which the normal traveling control or the ACC is selected. The driver may select the normal traveling control or the ACC by operating the input device. The controller 120 may execute the normal traveling control when the driver selects the normal traveling control and the ACC when the driver selects the ACC. When the driver performs a predetermined operation, such as a braking operation, in the ACC, the controller 120 may stop the ACC and make a switch from the ACC to the normal traveling control.

In the normal traveling control, the controller 120 determines a target vehicle-control force of the vehicle 1 on the basis of an accelerator position or a braking operation quantity. The controller 120 may then control the acceleration and deceleration rates of the vehicle 1 so that a vehicle-control force reaches the target vehicle-control force. The controller 120 switches a control mode of the normal traveling control between a normal mode and a one-pedal mode. The normal mode and the one-pedal mode may use different characteristics of the target vehicle-control force based on the accelerator position (hereinafter referred to as accelerator position characteristics). In the normal mode, the vehicle 1 may be accelerated by operating the accelerator pedal 51 and decelerated by operating the brake pedal 52. In the one-pedal mode, the vehicle 1 may be accelerated or decelerated by operating only the accelerator pedal 51.

For example, the vehicle 1 may be provided with an input device, such as a button, with which the control mode of the normal traveling control is selected. The driver may select the control mode by operating the input device. The controller 120 may execute the normal mode or the one-pedal mode whichever is selected in the normal traveling control.

Figure 3:
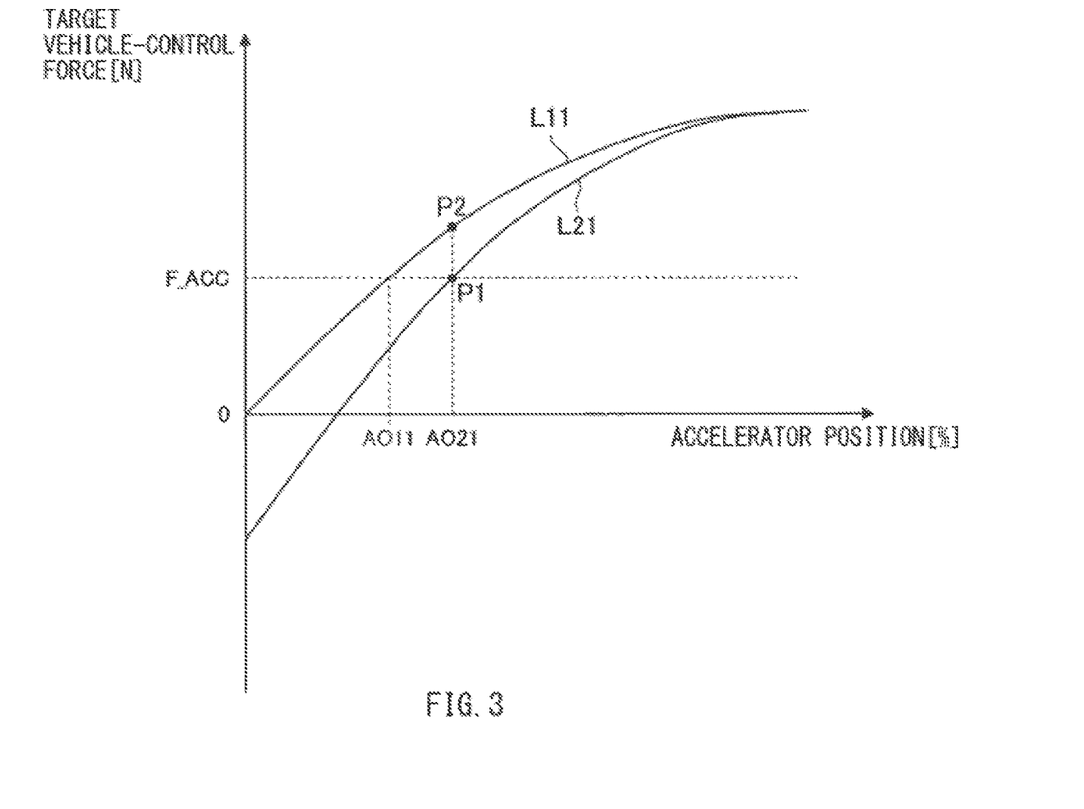
FIG. 3 is a diagram illustrating exemplary relations between each accelerator position and a corresponding target vehicle-control force of a normal characteristic and a one-pedal characteristic.

With reference to FIG. 3, a normal characteristic used as the accelerator position characteristic in the normal mode and a one-pedal characteristic used as the accelerator position characteristic in the one-pedal mode will now be described.

FIG. 3 is a diagram illustrating exemplary relations between each accelerator position and a corresponding target vehicle-control force of the normal characteristic and the one-pedal characteristic. In FIG. 3, the relation in the normal characteristic is indicated by a line L11, and the relation in the one-pedal characteristic by a line L21. The relations indicated by the lines L11 and L12 in FIG. 3 may be established under a condition where the vehicle speed is set to a constant speed (e.g., ten kilometers per hour). The same may apply to relations in accelerator position characteristics indicated by lines in FIGS. 5, 7, and 8 described below. In the normal characteristic, the target vehicle-control force based on an accelerator position of 0 [%] may sometimes take a value residing slightly on a driving force side (i.e., a positive value) to cause a creep phenomenon. In the example illustrated in FIG. 3, however, the target vehicle-control force based on the accelerator position of 0 [%] is substantially 0 [N] to facilitate understanding.

In the normal characteristic, as indicated by the line L11 in FIG. 3, the target vehicle-control force based on the accelerator position may take a value on the driving force side over an accelerator position range. For example, the target vehicle-control force may be substantially 0 [N] when the accelerator position is 0 [%], and then increase as the accelerator position increases. As described above, the line L11 in FIG. 3 represents the relation between each accelerator position and the corresponding target vehicle-control force under a condition where the vehicle speed is set to a constant speed (e.g., ten kilometers per hour).

When an accelerating operation is made in the normal mode that uses the normal characteristic as the accelerator position characteristic, the controller 120 may determine a value on the driving force side (i.e., a positive value) as the target vehicle-control force based on the accelerator position. This may allow the vehicle 1 to be accelerated by the operation of the acceleration pedal by the driver. When a braking operation is made in the normal mode that uses the normal characteristic as the accelerator position characteristic, the controller 120 may determine a value on a braking force side (i.e., a negative value) as the target vehicle-control force based on the braking operation quantity. This allows the vehicle 1 to be decelerated by the operation of the brake pedal by the driver.

Basically, in the normal characteristic, the target vehicle-control force based on the accelerator position only has to take a value on the driving force side in most part of the accelerator position range, and does not have to take a value on the driving force side over the entire accelerator position range in a strict sense. In other words, in the normal characteristic, the target baking force may take a value on the braking force side in part of the accelerator position range. For example, in the normal characteristic, the target vehicle-control force based on an accelerator position 0 [%] may reside slightly on the braking force side to generate a small braking force comparable with an engine braking force when the accelerator pedal is released. Even in such a case, a braking force large enough to stop the vehicle 1 will never be generated only by releasing the accelerator pedal unless the braking operation is made.

In the one-pedal characteristic, as indicated by the line L21 in FIG. 3, the target vehicle-control force based on the accelerator position may change from a value on the braking force side to a value on the driving force side as the accelerator position increases. For example, the target vehicle-control force may take a value on the braking force side when the accelerator position is 0 [%], and then increase beyond 0 [N] as the accelerator position increases. Accordingly, an accelerator position less than the accelerator position corresponding to the target vehicle-control force of 0 [N] may correspond to a target vehicle-control force taking a value on the braking force side, whereas an accelerator position greater than the accelerator position corresponding to the target vehicle-control force 0 [N] may correspond to a target vehicle-control force taking a value on the driving force side. Note that, as described above, the line L21 in FIG. 3 represents the relation between each accelerator position and a corresponding target vehicle-control force under a condition where the vehicle speed is set to a constant speed (e.g., ten kilometers per hour).

When an accelerator position less than the accelerator position corresponding to the target vehicle-control force of 0 [N] is detected upon the operation of the accelerator pedal in the one-pedal mode that uses the one-pedal characteristic as the accelerator position characteristic, the controller 120 may determine a value on the braking force side as the target vehicle-control force based on the accelerator position to decelerate the vehicle 1. In contrast, when an accelerator position greater than the accelerator position corresponding to the target vehicle-control force of 0 [N] is detected, the controller 120 may determine a value on the driving force side as the target vehicle-control force based on the accelerator position to accelerate the vehicle 1. This may allow the vehicle 1 to be accelerated and decelerated by operations on the accelerator pedal by the driver. For example, in the one-pedal mode, a braking force large enough to stop the vehicle 1 may be generated only by releasing the accelerator pedal without operating the brake pedal. However, when the brake pedal is operated in the one-pedal mode, the controller 120 may determine a value on the braking force side as the target vehicle-control force on the basis of the braking operation quantity, as in the normal mode. This may allow the vehicle 1 to be decelerated by not only the operation of the accelerator pedal but also the operation of the brake pedal.

As described above, the one-pedal mode that uses the one-pedal characteristic as the accelerator position characteristic may be set as the control mode of the normal traveling control of the vehicle 1. It therefore is possible to improve the operability of the vehicle 1 during the normal traveling control.

In the ACC, the controller 120 may determine the target vehicle-control force on the basis of the preceding-vehicle data, such as data on the presence or absence of a preceding vehicle, an inter-vehicular distance between the own vehicle and the preceding vehicle, or a relative speed of the own vehicle to the preceding vehicle. Additionally, the controller 120 may control the acceleration and deceleration rates of the vehicle 1 so that the vehicle-control force reaches the target vehicle-control force. In one embodiment, the controller 120 may determine such a target vehicle-control force that a predetermined inter-vehicular distance is maintained between the own vehicle and the preceding vehicle. If no preceding vehicle is detected, the controller 120 may determine such a target vehicle-control force that a predetermined vehicle speed of the vehicle 1 is maintained. Note that the data on the predetermined inter-vehicular distance and the predetermined vehicle speed may be stored in a storage in the control apparatus 100. The predetermined inter-vehicular distance and the predetermined vehicle speed may vary depending on operations inputted by the driver. The ACC may be appropriately achieved on the basis of the results of detection by the vehicle speed sensor 91 and the preceding vehicle sensor 92, for example.

In a case where the target vehicle-control force based on the accelerator position is greater than a target vehicle-control force F_ACC of the ACC in the ACC, the controller 120 may execute the override to control the acceleration and deceleration rates of the vehicle 1 on the basis of the target vehicle-control force based on the accelerator position, achieving a predetermined traveling operation, such as passing, in conformance to the driver's intention. For example, the controller 120 may determine a target vehicle-control force on the basis of an accelerator position and compare the target vehicle-control force based on the accelerator position with the target vehicle-control force F_ACC of the ACC. If the target vehicle-control force based on the accelerator position is greater than the target vehicle-control force F_ACC of the ACC, the controller 120 may execute the override.

As described above, the controller 120 in the control apparatus 100 makes a switch between the normal traveling control and the ACC. Additionally, the controller 120 switches the normal traveling control between the normal mode that uses the normal characteristic as the accelerator position characteristic and the one-pedal mode that uses the one-pedal characteristic as the accelerator position characteristic. Further, the controller 120 may execute the override in the ACC in a case where the target vehicle-control force based on the accelerator position is greater than the target vehicle-control force F_ACC of the ACC.

It is conceivable to use any of the accelerator position characteristics used in the control modes of the normal traveling control as an accelerator position characteristic for the override. The term "accelerator position characteristic for the override" may refer to an accelerator position characteristic used to determine whether or not to perform the override and to determine a target vehicle-control force based on an accelerator position during the execution of override.

In the example illustrated in FIG. 3, for example, a accelerator position AO11 corresponds to the target vehicle-control force F_ACC of the ACC using the normal characteristic indicated by the line L11. That is, in a case where the normal mode is set as the control mode of the normal traveling control and where the normal characteristic is used as the accelerator position characteristic for the override, the accelerator position AO11 corresponds to the target vehicle-control force F_ACC. In contrast, in the example illustrated in FIG. 3, an accelerator position AO21 greater than the accelerator position AO11 corresponds to the target vehicle-control force F_ACC of the ACC using the one-pedal characteristic indicated by the line L21. That is, in a case where the one-pedal mode is set as the control mode of the normal traveling control and where the one-pedal characteristic is used as the accelerator position characteristic for the override in the ACC, the accelerator position AO21 greater than the accelerator position AO11 corresponds to the target vehicle-control force F_ACC.

As described above, in a case where the one-pedal mode is set as the control mode of the normal traveling control and where the one-pedal characteristic is used as the accelerator position characteristic for the override, the accelerator position AO21 greater than the accelerator position AO11 may be required for the execution of the override, as indicated by a point P1 in FIG. 3. That is, the accelerator position required for the execution of the override may become greater in a case where the one-pedal characteristic is used as the accelerator position characteristic for the override than in a case where the normal characteristic is used as the accelerator position characteristic for the override. Accordingly, the operability of the vehicle 1 can be decreased due to the increase in the acceleration operation quantity.

A conceivable measure to suppress such a decrease in the operability due to the increase in the acceleration operation quantity could be to use the normal characteristic as the accelerator position characteristic for the override in a case where the one-pedal mode is set as the control mode of the normal traveling control. Such a measure, however, can raise a following concern, for example: The driver used to performing driving operations in the one-pedal mode would mistakenly perform an acceleration operation at the accelerator position AO21 that corresponds to the target vehicle-control force F_ACC in the one-pedal characteristic. In such a case, despite the fact that the normal characteristic is actually used as the accelerator position characteristic for the override, the value indicated by a point P2 in FIG. 3, which is significantly greater than the actual target vehicle-control force F_ACC, can be determined as the target vehicle-control force based on the accelerator position. This can cause rapid acceleration of the vehicle 1.

In contrast, according to the embodiment of the technology, in a case where the one-pedal mode is set as the control mode of the normal traveling control, the controller 120 may use a middle characteristic as the accelerator position characteristic for the override in the ACC to determine the target vehicle-control force based on the accelerator position. The target vehicle-control force based on the accelerator position is greater in the middle characteristic than in the one-pedal characteristic and less in the middle characteristic than in the normal characteristic over the accelerator position range. This improves the operability during the ACC of the vehicle 1 in which the one-pedal mode is settable as the control mode. The control relevant to the override executed by the control apparatus 100 is described in detail below.

[2. Exemplary Operations of Control Apparatus]

Some exemplary operations of the control apparatus 100 according to an example embodiment of the technology will now be described with reference to FIGS. 4 to 8. Note that, in the following description, first and second examples of a process executed by the control apparatus 100 are described in order.

[2-1. First Example]

The first example of the process executed by the control apparatus 100 will now be described with reference to FIGS. 4 and 5.

Figure 4:
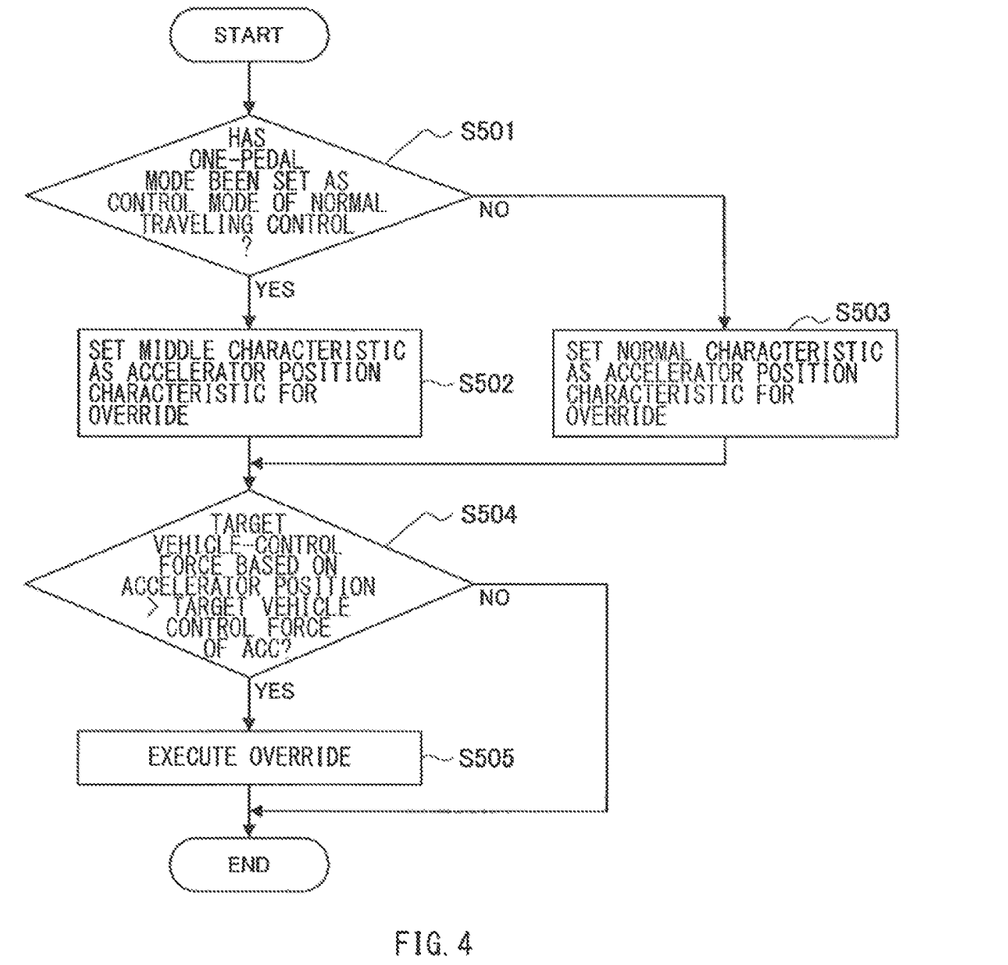
FIG. 4 is a flowchart illustrating one exemplary process flow executed by the control apparatus illustrated in FIG. 1.

FIG. 4 is a flowchart illustrating the first example of the process executed by the control apparatus 100. The control flow illustrated in FIG. 4 may be repeated by the controller 120 during the ACC, for example.

Once the flow of the control illustrated in FIG. 4 starts, the controller 120 may determine whether the one-pedal mode has been set as the control mode of the normal traveling control in Step S501. If the controller 120 may determine that the one-pedal mode has been set as the control mode of the normal traveling control (Step S501: YES), the procedure may proceed to Step S502. If the controller 120 may determine that the one-pedal mode has not been set as the control mode of the normal traveling control (i.e., the normal mode is set as the control mode) (Step S501: NO), the procedure may proceed to Step S503.

If it is determined as YES in Step S501, the controller 120 may set the middle characteristic as the accelerator position characteristic for the override in Step S502.

The middle characteristic will now be described with reference to FIG. 5.

Figure 5:
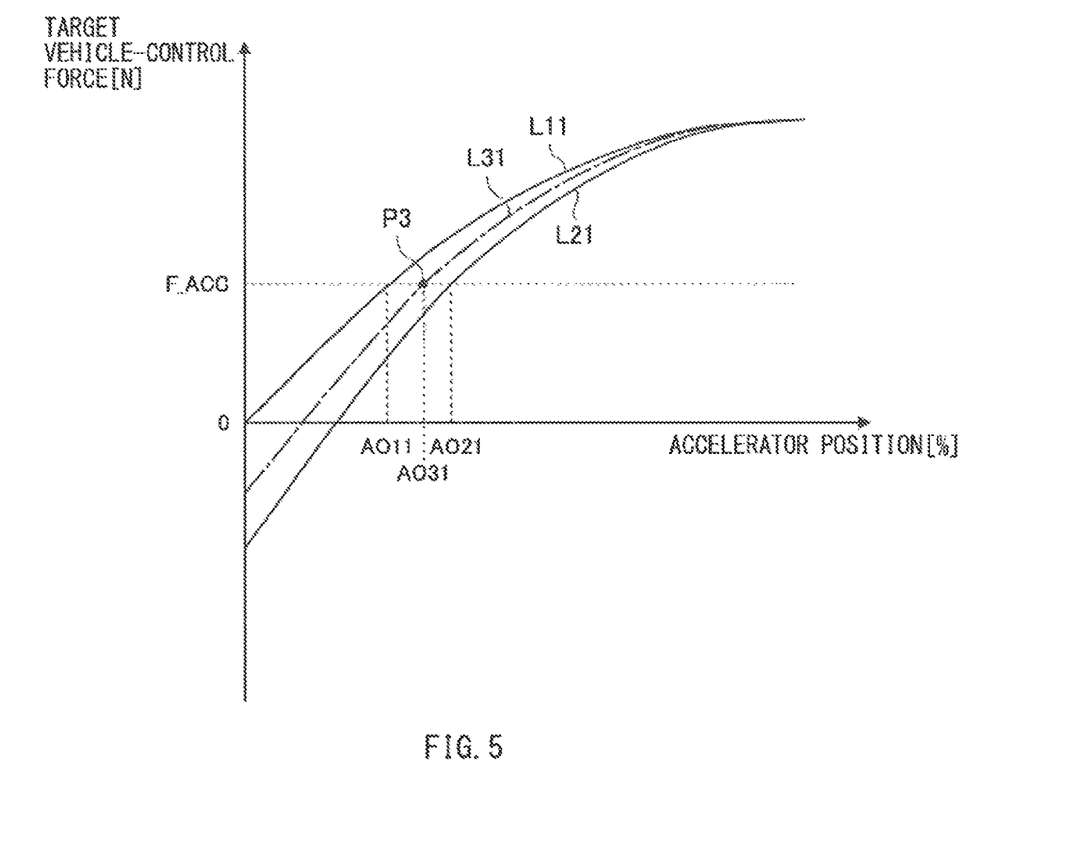
FIG. 5 is a diagram illustrating an example relation between each accelerator position and a corresponding target vehicle-control force of a middle characteristic.

FIG. 5 is a diagram illustrating an exemplary relation between each accelerator position and the corresponding target vehicle-control force of the middle characteristic. In FIG. 5, the relation in the middle characteristic is indicated by a line L31.

In the middle characteristic indicated by the line L31 in FIG. 5, the target vehicle-control force based on the accelerator position is greater than that in the one-pedal characteristic and less than that in the normal characteristic over the accelerator position range. For example, as illustrated in FIG. 5, the line L31 representing the middle characteristic is positioned above (i.e., more adjacent to or further on the driving force side than) the line L21 representing the one-pedal characteristic, and is positioned below (i.e., more adjacent to or further on the braking force side than) the line L11 representing the normal characteristic, at each accelerator position.

As described above, in a case where the one-pedal mode is set as the control mode of the normal traveling control, the middle characteristic may be used as the accelerator position characteristic for the override. For the determination whether to execute the override or during the execution of override, the target vehicle-control force based on the accelerator position may be determined using the middle characteristic. This suppresses a decrease in the operability and the occurrence of raid acceleration of the vehicle 1 due to an increase in the acceleration operation quantity. It therefore is possible to appropriately improve the operability of the vehicle 1 during the ACC.

In the example illustrated in FIG. 5, for example, an accelerator position AO31 greater than the accelerator position AO11 and less than the accelerator position AO21 corresponds to the target vehicle-control force F_ACC of the ACC using the middle characteristic indicated by the line L31. In a case where the one-pedal mode is set as the control mode of the normal traveling control, the middle characteristic may be used as the accelerator position characteristic for the override. This allows the accelerator position required for the execution of the override to be set to the accelerator position AO31, indicated by a point P3 in FIG. 5, that is greater than the accelerator position AO11 and less than the accelerator position AO21.

The accelerator position required for the execution of override is thereby reduced, compared with the case where the one-pedal characteristic is used as the accelerator position characteristic for the override. It therefore is possible to suppress a decrease in the operability due to an increase in the acceleration operation quantity. Furthermore, even when the acceleration operation is made at the accelerator position AO21, which corresponds to the target vehicle-control force F_ACC in the one-pedal characteristic, it is possible to prevent the target vehicle-control force based on the accelerator position from being greatly deviated from the target vehicle-control force F_ACC, compared with the case where the normal characteristic is used as the accelerator position characteristic for the override. It therefore is possible to suppress the occurrence of rapid acceleration of the vehicle 1.

If it is determined as NO in Step S501, the controller 120 may set the normal characteristic as the accelerator position characteristic for the override in Step S503.

In Step S504 after Step S502 or S503, the controller 120 may determine whether the target vehicle-control force based on the accelerator position is greater than the target vehicle-control force F_ACC of the ACC. If the target vehicle-control force based on the accelerator position is determined to be greater than the target vehicle-control force F_ACC of the ACC (Step S504: YES), the procedure may proceed to Step S505. In contrast, if the target vehicle-control force based on the accelerator position is determined not to be greater than the target vehicle-control force F_ACC of the ACC (Step S504: NO), the control flow illustrated in FIG. 4 may end.

For example, in a case where the middle characteristic is set as the accelerator position characteristic for the override (Step S502), the controller 120 may determine a target vehicle-control force based on an accelerator position using the middle characteristic, and determine whether the target vehicle-control force based on the accelerator position is greater than the target vehicle-control force F_ACC of the ACC (Step S504). In contrast, in a case where the normal characteristic is set as the accelerator position characteristic for the override (Step S503), the controller 120 may determine a target vehicle-control force based on an accelerator position using the normal characteristic, and determine whether the target vehicle-control force based on the accelerator position is greater than the target vehicle-control force F_ACC of the ACC (Step S504).

If it is determined as YES in Step S504, the controller 120 may execute the override in Step S505. This allows the acceleration and deceleration rates of the vehicle 1 to be controlled on the basis of the target vehicle-control force based on the accelerator position. It therefore is possible to achieve a predetermined traveling operation, such as passing, in conformance to the driver's intention.

Thereafter, the control flow illustrated in FIG. 4 may end.

The control flow illustrated in FIG. 4 may be repeated during the execution of the ACC, as described above. Thus, the process in Step S505 (i.e., execution of override) may be maintained while the target vehicle-control force based on the accelerator position is greater than the target vehicle-control force F_ACC of the ACC. If the target vehicle-control force based on the accelerator position becomes greater than the target vehicle-control force F_ACC of the ACC and thereafter the operation of the accelerator pedal is released, the override may be halted, and the vehicle 1 may be accelerated or decelerated on the basis of the target vehicle-control force F_ACC of the ACC (i.e., the target vehicle-control force determined on the basis of the preceding vehicle data).

[2-2. Second Example]

The second example of the process executed by the control apparatus 100 will now be described with reference to FIGS. 6 and 7.

Figure 6:
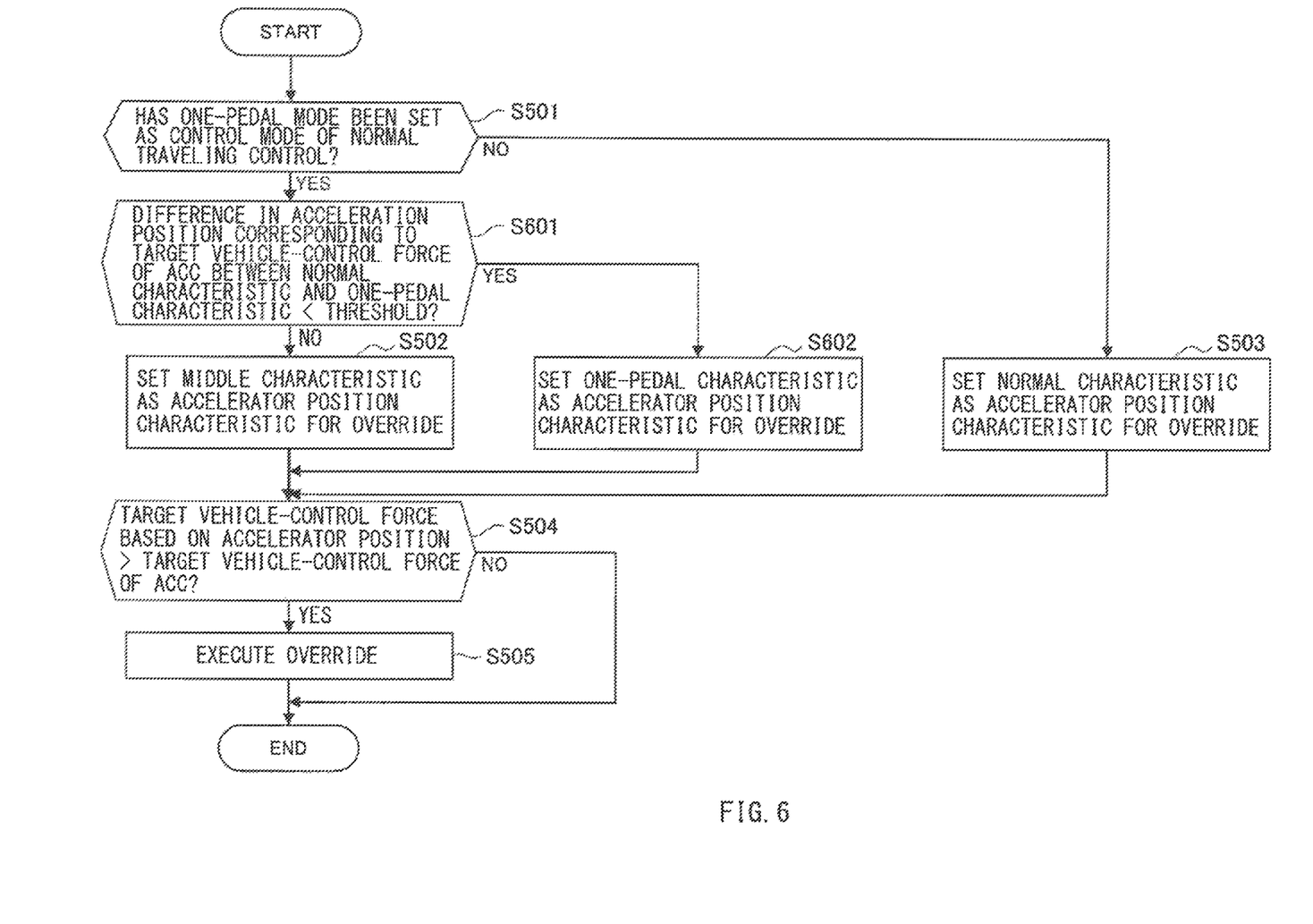
FIG. 6 is a flowchart illustrating another exemplary process flow executed by the control apparatus illustrated in FIG. 1.

FIG. 6 is a flowchart illustrating the second example of the process executed by the control apparatus 100. The control flow illustrated in FIG. 6 may be repeated by the controller 120 during the ACC, as in the control flow illustrated in FIG. 4.

The second example may differ from the first example in the flow of setting the accelerator position characteristic for the override after the determination that the one-pedal mode has been set as the control mode of the normal traveling control.

In the control flow in the second example illustrated in FIG. 6, if it is determined as NO in Step S501, the procedure may proceed to Step S503, as in the control flow of the first example illustrated in FIG. 4. In contrast, if it is determined as YES in Step S501, the procedure may proceed to Step S601, unlike the control flow of the first example illustrated in FIG. 4.

If it is determined as YES in Step S501, the controller 120 may determine, in Step S601, whether the difference in an accelerator position corresponding to the target vehicle-control force F_ACC of the ACC between the normal characteristic and the one-pedal characteristic is less than a threshold. If the difference is not less than the threshold (Step S601: NO), the procedure may proceed to Step S502. In contrast, if the difference is less than the threshold (Step S601: YES), the procedure may proceed to Step S602.

Figure 7:
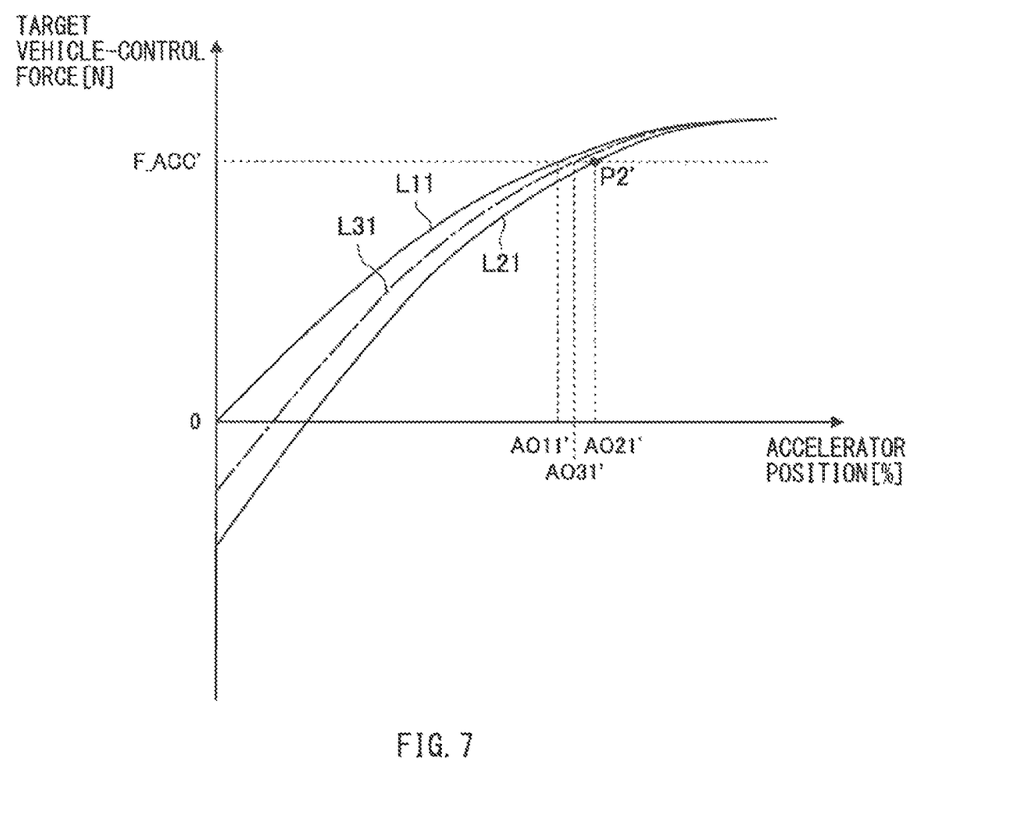
FIG. 7 is a diagram illustrating an exemplary relation between each accelerator position and a corresponding target vehicle-control force of each accelerator position characteristic under a condition where the target vehicle-control force of adaptive cruise control is relatively high.

FIG. 7 is a diagram illustrating an exemplary relation between each accelerator position and a corresponding target vehicle-control force of each accelerator position characteristic under a condition where the target vehicle-control force of the ACC is relatively high.

In the example illustrated in FIG. 7, for example, a target vehicle-control force F_ACC' of the ACC is greater than the target vehicle-control force F_ACC of the ACC in the example illustrated in FIG. 5. Accordingly, the difference between an accelerator position AO11' and an accelerator position AO21' is less than the difference between the accelerator position AO11 and the accelerator position AO21 illustrated in FIG. 5, where the accelerator position AO11' corresponds to the target vehicle-control force F_ACC' in the normal characteristic indicated by the line L11, and the accelerator position AO21' corresponds to the target vehicle-control force F_ACC' in the one-pedal characteristic indicated by the line L21. Note that an accelerator position AO31' corresponding to the target vehicle-control force F_ACC' in the middle characteristic indicated by the line L31 is greater than the accelerator position AO11' and less than the accelerator position AO21'.

In a case where the target vehicle-control force is relatively high in the ACC as described above and where the difference in the accelerator position corresponding to the target vehicle-control force F_ACC' of the ACC between the normal characteristic and the one-pedal characteristic (e.g., the difference between the accelerator position AO11' and the accelerator position AO21' illustrated in the example of FIG. 7) is less than the threshold (Step S601: YES), the procedure may proceed to Step S602 in which the one-pedal characteristic is set as the accelerator position characteristic for the override as described below. The accelerator position AO21' that is indicated by a point P2' in the example illustrated in FIG. 7 may be thereby set as the accelerator position required for the execution of override.

The threshold may be set to such a value that it is possible to appropriately determine whether a difference in the operability due to a difference in the accelerator operation quantity is slight between the case where the normal characteristic is used as the accelerator position characteristic for the override and the case where the one-pedal characteristic is used as the accelerator position characteristic for the override. Accordingly, if the difference in the accelerator position corresponding to the target vehicle-control force of the ACC between the normal characteristic and the one-pedal characteristic is less than the threshold, the one-pedal characteristic may be used as the accelerator position characteristic for the override without unnecessary use of the middle characteristic as the accelerator position characteristic for the override. This effectively suppresses the occurrence of rapid acceleration of the vehicle 1, for example. Optionally, the controller 120 may cause the display 71 to provide the driver with a notification about which control mode has been set. Because an unnecessary use of the middle characteristic as the accelerator position characteristic for the override is prevented, it is possible to prevent the driver from having a feeling of strangeness due to a discrepancy between the control mode displayed on the display 71 and the control mode actually set as the accelerator position characteristic for the override.

If it is determined as NO in Step S601, the controller 120 may set the middle characteristic as the accelerator position characteristic for the override in Step S502. In contrast, if it is determined as YES in Step S601, the controller 120 may set the one-pedal characteristic as the accelerator position characteristic for the override in Step S602.

In Step S504 after Step S502 or Step S602, it may be determined whether or not to execute the override, as in the first example described above. On the basis of the result of the determination, the override may be executed.

In some embodiments described above, the single one-pedal mode may be set as the control mode of the normal traveling control. In another embodiment, however, two or more one-pedal modes may be set as the control mode of the normal traveling control. In this case, the one-pedal modes may have different one-pedal characteristics. In other words, the controller 120 may switch the control mode of the normal traveling control between the two or more one-pedal modes having different one-pedal characteristics.

Figure 8:
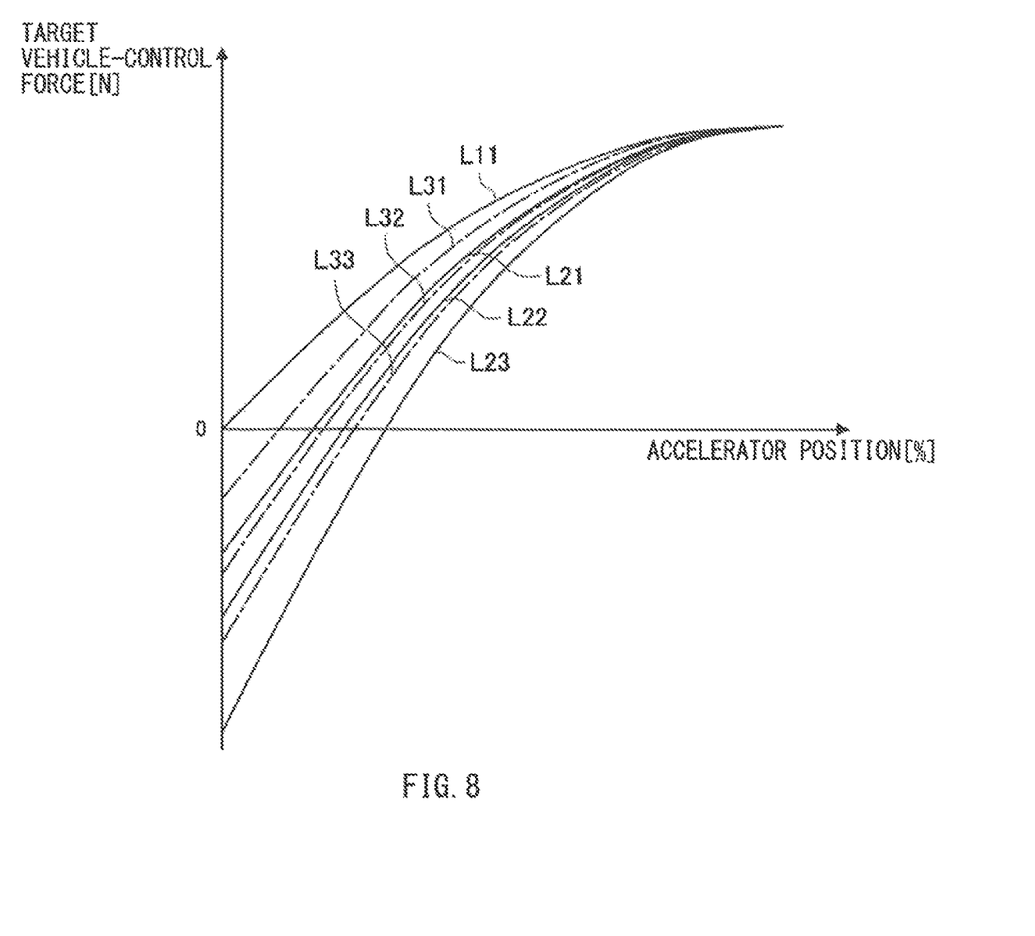
FIG. 8 is a diagram illustrating exemplary relations between each accelerator position and a corresponding target vehicle-control force of several middle characteristics and several one-pedal characteristics under a condition where several one-pedal modes are settable as the control mode of normal traveling control.

FIG. 8 is a diagram illustrating exemplary relations between each accelerator position and a corresponding target vehicle-control force of several one-pedal characteristics and several middle characteristics under a condition where the several one-pedal modes are settable as the control mode of the normal traveling control.

In the example illustrated in FIG. 8, for example, one-pedal characteristics indicated by lines L22 and L23 are prepared in addition to the one-pedal characteristic indicated by the line L21 described above. In the one-pedal characteristic indicated by the line L22, the target vehicle-control force based on the accelerator position is less than that in the one-pedal characteristic indicated by the line L21 over the accelerator position range. In the one-pedal characteristic indicated by the line L23, the target vehicle-control force based on the accelerator position is less than that in the one-pedal characteristic indicated by the line L22 over the accelerator position range.

Additionally, in the example illustrated in FIG. 8, middle characteristics indicated by lines L32 and L33 are prepared in addition to the middle characteristic indicated by the line L31 described above. In the middle characteristic indicated by the line L32, the target vehicle-control force corresponding to each accelerator position is greater than that in the one-pedal characteristic indicated by the line L22 and less than that in the normal characteristic indicated by the line L11 over the accelerator position range. In the middle characteristic indicated by the line L33, the target vehicle-control force based on the accelerator position is greater than that in the one-pedal characteristic indicated by the line L23 and less than that in normal characteristic indicated by the line L11 over the accelerator position range.

In the example illustrated in FIG. 8, in a case where the one-pedal mode indicated by the line L21 is set as the control mode of the normal traveling control, the controller 120 may set the middle characteristic indicated by the line L31 as the accelerator position characteristic for the override in the ACC. In another case where the one-pedal mode indicated by the line L22 is set as the control mode of the normal traveling control, the controller 120 may set the middle characteristic indicated by the line L32 as the accelerator position characteristic for the override in the ACC. In still another case where the one-pedal mode indicated by the line L23 is set as the control mode of the normal traveling control, the controller 120 may set the middle characteristic indicated by the line L33 as the accelerator position characteristic for the override in the ACC.

In this way, in a case where the one-pedal mode is set as the control mode of the normal traveling control, the controller 120 may switch the middle characteristic selected as the accelerator position characteristic for the override between two or more middle characteristics in accordance with the switching between the one-pedal modes. This allows the accelerator position required for the execution of the override to vary depending on the set one-pedal mode under a condition where several one-pedal modes are settable as the control mode of the normal traveling control. Accordingly, it is possible to appropriately suppress a decrease in the operability due to an increase in the acceleration operation quantity and the occurrence of rapid acceleration of the vehicle 1, on the basis of the one-pedal mode set as the control mode.

[3. Example Effects of Control Apparatus]

Some effects of the control apparatus 100 according to at least one of the embodiments described above will now be described.

In at least one of the embodiments described above, the vehicle-control force (i.e., acceleration and deceleration rates of the vehicle) is controlled on the basis of the acceleration and deceleration operations by the driver, to achieve a predetermined traveling operation, such as passing, in conformance to the driver's intention. For example, when the target vehicle-control force based on the accelerator position is greater than the target vehicle-control force of the ACC, the override is executed to control the acceleration and deceleration rates of the vehicle on the basis of the target vehicle-control force based on the accelerator position. However, there is a concern that the accelerator position corresponding to the target vehicle-control force of the ACC can become greater in a case where the one-pedal mode is set as the control mode of the normal traveling control than in a case where the normal mode is set as the control mode of the normal traveling control, as illustrated in FIG. 5. That is, the accelerator position required for the execution of override can become greater in the one-pedal mode, resulting in an increase in the acceleration operation quantity. This can decrease the operability of the vehicle 1. The embodiments described above are able to address such a concern.

In the control apparatus 100 according to at least one of the embodiments described above, the controller 120 makes a switch between the normal traveling control and the cruise control such as the ACC. Additionally, the controller 120 switches the normal traveling control between the normal mode that uses the normal characteristic as the accelerator position characteristic and the one-pedal mode that uses the one-pedal characteristic as the accelerator position characteristic. Further, the controller 120 executes the override in the cruise control when the target vehicle-control force based on the accelerator position is greater than the target vehicle-control force of the cruise control. In a case where the one-pedal mode is set as the control mode of the normal traveling control, the controller 120 according to at least one of the embodiments described above sets the middle characteristic as the accelerator position characteristic for the override in the cruise control and determines the target vehicle-control force based on the accelerator position. The target vehicle-control force based on the accelerator position is greater in the middle characteristic than in the one-pedal characteristic and less in the middle characteristic than that in the normal characteristic over the accelerator position range. The use of the middle characteristic suppresses a decrease in the operability due to an increase in the acceleration operation quantity and the occurrence of rapid acceleration of the vehicle 1. Accordingly, it is possible to appropriately improve the operability, during the cruise control, of the vehicle 1 to which the one-pedal mode is settable as the control mode the vehicle 1.

In a case where the one-pedal mode is set as the control mode of the normal traveling control and where the difference in the accelerator position corresponding to the target vehicle-control force of the cruise control between the normal characteristic and the one-pedal characteristic is less than the threshold, the controller 120 in the control apparatus 100 according to at least one of the embodiments described above sets the one-pedal characteristic as the accelerator position characteristic for the override. This prevents unnecessary use of the middle characteristic as the accelerator position characteristic for the override. It therefore is possible to effectively suppress the occurrence of rapid acceleration of the vehicle 1, for example.

Optionally, in the control apparatus 100 according to at least one of the embodiments described above, the controller 120 may cause the display 71 to provide the driver with a notification about which control mode has been set. In such a case where the set control mode is displayed and where the difference in the accelerator position corresponding to the target vehicle-control force of the cruise control between the normal characteristic and the one-pedal characteristic is less than the threshold, the one-pedal characteristic may be set as the accelerator position characteristic for the override. Accordingly, it is possible to prevent the driver from having a feeling of strangeness due to the discrepancy between the control mode displayed on the display and the control mode actually set as the accelerator position characteristic for the override.

In the control apparatus 100 according to at least one of the embodiments described above, the controller 120 may switch the control mode of the normal traveling control among several one-pedal modes having different one-pedal characteristics. Furthermore, in a case where the one-pedal modes are set as the control mode of the normal traveling control, the controller 120 may switch the middle characteristic selected as the accelerator position characteristic for the override in the cruise control between two or more middle characteristics in accordance with the switching of the one-pedal modes. This allows the accelerator position required for the execution of override to vary depending on the one-pedal mode set as the control mode. It therefore is possible to appropriately suppress a decrease in the operability due to an increase in the acceleration operation quantity and the occurrence of rapid acceleration of the vehicle 1, on the basis of the one-pedal mode set as the control mode.

[4. Conclusion]

According to at least one of the embodiments described above, it is possible to appropriately execute the override in the cruise control of the vehicle that is switchable between the normal mode and the one-pedal mode in the normal traveling control. It is also possible to provide improved operability in the cruise control.

Some embodiments of the technology are described in detail above with reference to the accompanying drawings. It should be appreciated that the embodiments of the technology described above are mere examples and are not intended to limit the scope of the technology. It should be also appreciated that various omissions, replacements, and modifications may be made in the foregoing embodiments described herein, without departing from the scope of the technology. The technology is intended to include such modifications and alterations in so far as they fall within the scope of the appended claims or the equivalents thereof.

For example, some of the steps of the process described herein with reference to the flowchart are not necessarily executed in the order indicated by the flowchart. Optionally, additional steps may be included in the process or some of the steps of the process may be omitted.

The controller 120 in the control apparatus 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 120 in the control apparatus 100 illustrated in FIG. 2.

The invention claimed is:

1. A vehicle control apparatus configured to control a vehicle-control force of a vehicle that is switchable between traveling under normal traveling control in which the vehicle-control force is controlled on a basis of an acceleration operation or a deceleration operation by a driver and traveling under cruise control in which the vehicle-control force is automatically controlled regardless of the acceleration operation and the deceleration operation by the driver, the apparatus comprising:

a first target-vehicle-control-force determination unit configured to determine a target vehicle-control force of the normal traveling control on a basis of an accelerator position, and switch, upon the determination of the target vehicle-control force of the normal traveling control, a control mode of the normal traveling control between a normal mode and a one-pedal mode, the normal mode using a normal characteristic in which a target vehicle-control force for each accelerator position takes a value on a driving force side over an accelerator position range, the one-pedal mode using a one-pedal characteristic in which the target vehicle-control force for each accelerator position changes from a value on a braking force side to a value on the driving force side as the accelerator position increases;

a second target-vehicle-control-force determination unit configured to determine a target vehicle-control force of the cruise control, and execute, when the accelerator position is greater than a reference accelerator position corresponding to the target vehicle-control force of the cruise control, override in which a target vehicle-control force of the override is determined on a basis of an accelerator position characteristic that defines a relation between an accelerator position and a target vehicle-control force; and a vehicle-control-force controlling unit configured to control the vehicle-control force on a basis of the target vehicle-control force determined by the first target-vehicle-control-force determination unit or the second target-vehicle-control-force determination unit, wherein in a case where the one-pedal mode is set as the control mode of the normal traveling control, the second target-vehicle-control-force determination unit is configured to set a middle characteristic as the accelerator position characteristic for the override, the target vehicle-control force for each accelerator position being greater in the middle characteristic than in the one-pedal characteristic and less in the middle characteristic than in the normal characteristic over the accelerator position range.

2. The vehicle control apparatus according to claim 1, wherein in a case where the one-pedal mode is set as the control mode of the normal traveling control and where a difference in an accelerator position corresponding to the target vehicle-control force of the cruise control between the normal characteristic and the one-pedal characteristic is less than a threshold, the second target-vehicle-control-force determination unit is further configured to set the one-pedal characteristic as the accelerator position characteristic for the override.

3. The vehicle control apparatus according to claim 2 further comprising a display configured to display the control mode set by the first target-vehicle-control-force determination unit.

4. The vehicle control apparatus according to claim 3, wherein, in a case where the one-pedal mode is set as the control mode of the normal traveling control, the first target-vehicle-control-force determination unit is further configured to switch the one-pedal characteristic between two or more one-pedal characteristics that are different in the target vehicle-control force for each accelerator position, and the second target-vehicle-control-force determination unit is further configured to switch the middle characteristic set as the accelerator position characteristic for the override between two or more middle characteristics in accordance with the switching between the one-pedal characteristics by the first target-vehicle-control-force determination unit.

5. The vehicle control apparatus according to claim 4, wherein the second target-vehicle-control-force determination unit is configured to set one of the middle characteristics in which the target vehicle-control force for each accelerator position is greater in accordance with the switching to one of the one-pedal characteristics in which the target vehicle-control force for each accelerator position is greater.

6. The vehicle control apparatus according to claim 2, wherein, in a case where the one-pedal mode is set as the control mode of the normal traveling control, the first target-vehicle-control-force determination unit is further configured to switch the one-pedal characteristic between two or more one-pedal characteristics that are different in the target vehicle-control force for each accelerator position, and the second target-vehicle-control-force determination unit is further configured to switch the middle characteristic set as the accelerator position characteristic for the override between two or more middle characteristics in accordance with the switching between the one-pedal characteristics by the first target-vehicle-control-force determination unit.

7. The vehicle control apparatus according to claim 6, wherein the second target-vehicle-control-force determination unit is configured to set one of the middle characteristics in which the target vehicle-control force for each accelerator position is greater in accordance with the switching to one of the one-pedal characteristics in which the target vehicle-control force for each accelerator position is greater.

8. The vehicle control apparatus according to claim 1 further comprising a display configured to display the control mode set by the first target-vehicle-control-force determination unit.

9. The vehicle control apparatus according to claim 8, wherein, in a case where the one-pedal mode is set as the control mode of the normal traveling control, the first target-vehicle-control-force determination unit is further configured to switch the one-pedal characteristic between two or more one-pedal characteristics that are different in the target vehicle-control force for each accelerator position, and the second target-vehicle-control-force determination unit is further configured to switch the middle characteristic set as the accelerator position characteristic for the override between two or more middle characteristics in accordance with the switching between the one-pedal characteristics by the first target-vehicle-control-force determination unit.

10. The vehicle control apparatus according to claim 9, wherein the second target-vehicle-control-force determination unit is configured to set one of the middle characteristics in which the target vehicle-control force for each accelerator position is greater in accordance with the switching to one of the one-pedal characteristics in which the target vehicle-control force for each accelerator position is greater.

11. The vehicle control apparatus according to claim 1, wherein, in a case where the one-pedal mode is set as the control mode of the normal traveling control, the first target-vehicle-control-force determination unit is further configured to switch the one-pedal characteristic between two or more one-pedal characteristics that are different in the target vehicle-control force for each accelerator position, and the second target-vehicle-control-force determination unit is further configured to switch the middle characteristic set as the accelerator position characteristic for the override between two or more middle characteristics in accordance with the switching between the one-pedal characteristics by the first target-vehicle-control-force determination unit.

12. The vehicle control apparatus according to claim 11, wherein the second target-vehicle-control-force determination unit is configured to set one of the middle characteristics in which the target vehicle-control force for each accelerator position is greater in accordance with the switching to one of the one-pedal characteristics in which the target vehicle-control force for each accelerator position is greater.

13. A method of controlling a vehicle-control force of a vehicle that is switchable between traveling under normal traveling control in which the vehicle-control force is controlled on a basis of an acceleration operation or a deceleration operation by a driver and traveling under cruise control in which the vehicle-control force is automatically controlled regardless of the acceleration operation and the deceleration operation by the driver, the method comprising:

determining a target vehicle-control force of the normal traveling control on a basis of an accelerator position, and making, upon the determining the target vehicle-control force of the normal traveling control, a switch between a normal characteristic in which a target vehicle-control force for each accelerator position takes a value on a driving force side over an accelerator position range and a one-pedal characteristic in which the target vehicle-control force for each accelerator position changes from a value on a braking force side to a value on the driving force side as the accelerator position increases;

determining a target vehicle-control force of the cruise control;

executing, when the accelerator position is greater than a reference accelerator position corresponding to the target vehicle-control force of the cruise control in the cruise control, override in which a target vehicle-control force of the override is determined on a basis of an accelerator position characteristic of the vehicle; and setting, in a case where the target vehicle-control force of the normal traveling control is determined using the one-pedal characteristic, the accelerator position characteristic for the override to a middle characteristic, the target vehicle-control force for each accelerator position being greater in the middle characteristic than in the one-pedal characteristic and less in the middle characteristic than in the normal characteristic over the accelerator position range.

14. A vehicle control apparatus configured to control a vehicle-control force of a vehicle that is switchable between traveling under normal traveling control in which the vehicle-control force is controlled on a basis of an acceleration operation or a deceleration operation by a driver and traveling under cruise control in which the vehicle-control force is automatically controlled regardless of the acceleration operation and the deceleration operation by the driver, the apparatus comprising circuitry configured to switch a control mode of the normal traveling control between a normal mode using a normal characteristic in which a target vehicle-control force for each accelerator position takes a value on a driving force side over an accelerator position range and a one-pedal mode using a one-pedal characteristic in which the target vehicle-control force for each accelerator position changes from a value on a braking force side to a value on the driving force side as the accelerator position increases, execute, when the accelerator position is greater than a reference accelerator position corresponding to a target vehicle-control force of the cruise control in the cruise control, override in which a target vehicle-control force of the override is determined on as basis an accelerator position characteristic of the vehicle, and determine, in a case where the one-pedal mode is set as the control mode of the normal traveling control, the target traveling-control force of the override using a middle characteristic as the accelerator position characteristic for the override, the target vehicle-control force for each accelerator position being greater in the middle characteristic than in the one-pedal characteristic and less in the middle characteristic than in the normal characteristic over the accelerator position range.

* * * * *